United States Patent [19]

Gold

[11] 4,172,647

[45] Oct. 30, 1979

[54] CAMERA BACK

[75] Inventor: Nicholas Gold, Arlington, Mass.

[73] Assignee: Polaroid Corporation, Cambridge, Mass.

[21] Appl. No.: 910,689

[22] Filed: May 30, 1978

[51] Int. Cl.$^2$ .................... G03B 17/50; G03B 17/04; G03B 17/02

[52] U.S. Cl. .................................... 354/86; 354/187; 354/288

[58] Field of Search .................... 354/83, 86, 275–277, 354/187, 288

[56] References Cited

U.S. PATENT DOCUMENTS

| | | | |
|---|---|---|---|
| 2,496,630 | 2/1950 | Land | 354/86 |
| 3,103,865 | 9/1963 | Mason et al. | 354/86 |
| 3,350,990 | 11/1967 | Finelli et al. | 354/86 |
| 3,618,493 | 11/1971 | Erlichman | 354/86 |
| 3,852,780 | 12/1974 | Augustin et al. | 354/86 |
| 3,852,781 | 12/1974 | Erlichman | 354/86 |
| 3,852,783 | 12/1974 | Kennedy et al. | 354/276 X |
| 4,023,191 | 5/1977 | Augustin et al. | 354/86 |
| 4,034,386 | 7/1977 | Gold | 354/275 X |
| 4,075,643 | 2/1978 | Lane | 354/86 |

Primary Examiner—Donald A. Griffin

Attorney, Agent, or Firm—Alfred E. Corrigan

[57] ABSTRACT

A camera back for processing film units of the self-developing or instant type. The camera back, which preferably is adapted to replace the back of a conventional camera, e.g., a 35 mm camera, includes a first housing for supporting a film cassette containing a stack of film units in position for exposure of an endmost film unit in the stack and a pair of rollers for spreading a processing fluid across an element of the film unit after it has been photographically exposed. A second housing including an expansible chamber is reciprocally mounted to the first housing for movement between a first position in which the chamber is collapsed and a second position in which it is extended. A gear rack is coupled to the second housing and to a gear on one of the rollers for driving the latter. The exposed film unit is processed by moving its leading edge into the bite of the rollers and then manually grasping the second housing and moving it from the first position to the second position. This movement is used to drive the roller and thus advance the exposed film unit through the rollers and into the continually expanding chamber which provides a dark environment for the film unit.

2 Claims, 5 Drawing Figures

CAMERA BACK

BACKGROUND OF THE INVENTION

1. Field of the Invention

This invention relates to a camera back for processing film units of the self-developing or instant type.

2. Description of the Prior Art

The versatility of some of today's standard cameras has been enhanced by making available to them a camera back having the capability of processing film units of the self-developing or instant type. U.S. Pat. Nos. 4,023,191 and 3,852,780 show camera backs for converting cameras of the conventional type for use with self-developing type film. However, while these camera backs perform their intended function, they lack certain admirable features which are desirable in today's photographic market. For example, the rapidity with which the camera back of U.S. Pat. No. 3,852,780 can be substituted for the camera's conventional back leaves some room for concern; while the bulkiness of the camera back of the U.S. Pat. No. 4,023,191 leaves something to be desired. From the foregoing, it can be seen that there is a need for a camera back having the capability to process film units of the self-developing type, which camera back is compact and can be readily substituted for that of a conventional camera.

SUMMARY OF THE INVENTION

The instant invention relates to a camera back for processing film units of the self-developing type, which camera back is adapted to replace the back of a conventional camera such as the Minox 35 EL manufactured by Minox GmbH of Lahnstadt 1 West Germany. The camera back includes a first housing having a generally U-shaped section whose free edges are provided with rails and grooves which are adapted to slidably receive similarly shaped structure on the main body of the camera for readily attaching the two in a lighttight manner. Immediately behind the U-shaped section is a chamber for receiving a film cassette containing at least one film unit of the self-developing type. The film cassette contains an exposure aperture which is adapted to be located in alignment with an exposure opening in one of the walls of the U-shaped section, an ingress opening through which a portion of a film advancing apparatus is adapted to extend, and an exit slot through which a film unit is adapted to be moved subsequent to exposure. The film advancing apparatus includes a cantilevered member whose free end is located within the film chamber in position to enter the ingress opening in the film cassette, and a manually actuatable plunger which is accessible exteriorly of the first housing. A pair of elongate pressure applying rollers are mounted at one end of the film chamber in position to receive a leading edge of a film unit as it is being advanced by the cantilevered member out of the film cassette via the exit slot. As is well known, the rollers have a length approximately equal to the width of the film unit and are adapted to rupture a container of processing liquid attached to the leading edge of the film unit and spread its contents across the film unit so as to initiate the formation of a visible image therein.

A second housing is mounted to the first housing for reciprocating movement. The second housing includes a U-shaped section, the legs of which are adapted to slidably straddle the film chamber. The bight portion of the U-shaped section connecting the legs is generally parallel with the axes of the rollers and includes a light-tight opening through which an exposed film unit is adapted to protrude into the ambient light. A dark chamber formed from an expansible opaque bellows having opposite open ends has one of its open ends connected to the first housing in surrounding relation to an egress opening in the first housing and its opposite open end connected in surrounding relation to the light-tight opening in the bight portion of the U-shaped section.

One of the pressure applying rollers is provided with a gear on opposite ends thereof. These gears are adapted to mesh with a gear rack secured to each of the legs of the U-shaped section of the second housing in order to convert the linear movement of the second housing into rotary movement of the pressure applying rollers.

In operation, the back of the conventional camera is removed and the camera back of the instant invention is slid onto the main section of the camera and retained thereon in lighttight relation by the frictional fit therebetween, or by any conventional latch. This operation takes approximately ten (10) seconds. Assuming the camera back had been previously loaded with a new or fresh film cassette, the manually actuatable plunger is depressed thereby moving the free end of the cantilevered member into engagement with the trailing edge of a dark slide located within the cassette to advance it into engagement with the pressure-applying rollers. During the latter portion of the movement of the plunger, its opposite end moves into engagement with one of the gear racks so as to drive it and its associated gear sufficiently to pull the leading edge of the dark slide into the bite between the rollers. Alternatively, the leading edge of the dark slide may be maintained in firm engagement with the rollers by maintaining the plunger in its down or fully depressed position. Next, the legs of the U-shaped section of the second housing are manually grasped so as to move the second housing away from the first housing thereby extending the bellows. As the second housing is moving toward its fully extended position the gear racks are rotating the gears so as to drive the rollers in a manner which advances the dark slide through the egress opening in the first housing and into the dark chamber. During the movement of the dark slide between the rollers and into the dark chamber it passes between a pair of sheet-like members which frictionally retain the dark slide after it has been moved out of engagement with the rollers. This retention is such that the leading edge of the dark slide is positioned for subsequent protrusion through the lighttight opening in the bight of the U-shaped section of the second housing. The second housing is then moved back to its original position thereby collapsing the dark chamber. As the length of the dark chamber decreases, the light-tight opening at the end of the chamber approaches the leading edge of the dark slide until it, the leading edge, eventually protrudes through the opening where it now may be grasped by the user and removed from the dark chamber. The uppermost film unit in the film cassette, i.e., the film unit located adjacent to and in alignment with the exposure aperture in the cassette, is now ready for exposure. After the uppermost film unit has been exposed, the above sequence of steps are repeated except for the length of time that the second housing is maintained in its extended position. In other words, when an exposed film unit is in the extended dark chamber, it is allowed to remain therein for a predetermined period of time. This predetermined period of time is dependent upon the suceptibility of the exposed film unit to being further exposed by ambient light. If it is not, then the second housing may be immediately returned to its original collapsed position thereby causing the leading end of the exposed film unit to protrude through the lighttight opening. On the other hand, if it is still susceptible to being further exposed by the ambient light, i.e., the light outside of the dark chamber, the predetermined period of time is at least equal to that necessary for the processing liquid to imbibe the layers of the film unit to the extent that it will no longer be adversely affected by moving it into the ambient light via the lighttight opening.

Preferably, the above-described film unit is of the type shown in FIG. 12 and described in columns 17 and 18 of U.S. Pat. No. 3,647,437 and is of a size corresponding to that of a 35 mm slide. Alternatively, instead of a color transparency, it could be of the type which produces a reflective print such as that described in U.S. Pat. No. 3,594,165.

An object of the invention is to provide a camera back of the type for processing film units of the self-developing type, which camera back may be readily substituted for the back of a conventional camera.

Another object of the invention is to provide a camera back of the type described wherein a fully processed film unit is automatically presented to the user in response to the collapsing of a dark chamber.

Another object of the invention is to provide a camera back of the type described wherein actuation of a film advancing apparatus is effective to move an exposed film unit toward the bite of a pair of elongate pressure applying rollers and to drive one of the rollers sufficiently to move the leading edge of the advancing film unit fully into the bite of the rollers.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

BRIEF DESCRIPTION OF THE DRAWINGS

For a fuller understanding of the nature and objects of the invention, reference should be had to the following detailed description taken in connection with the accompanying drawings wherein:

FIG. 1A is an enlarged perspective view, with portions broken away, of the relationship between elements of the invention;

Figure 1:
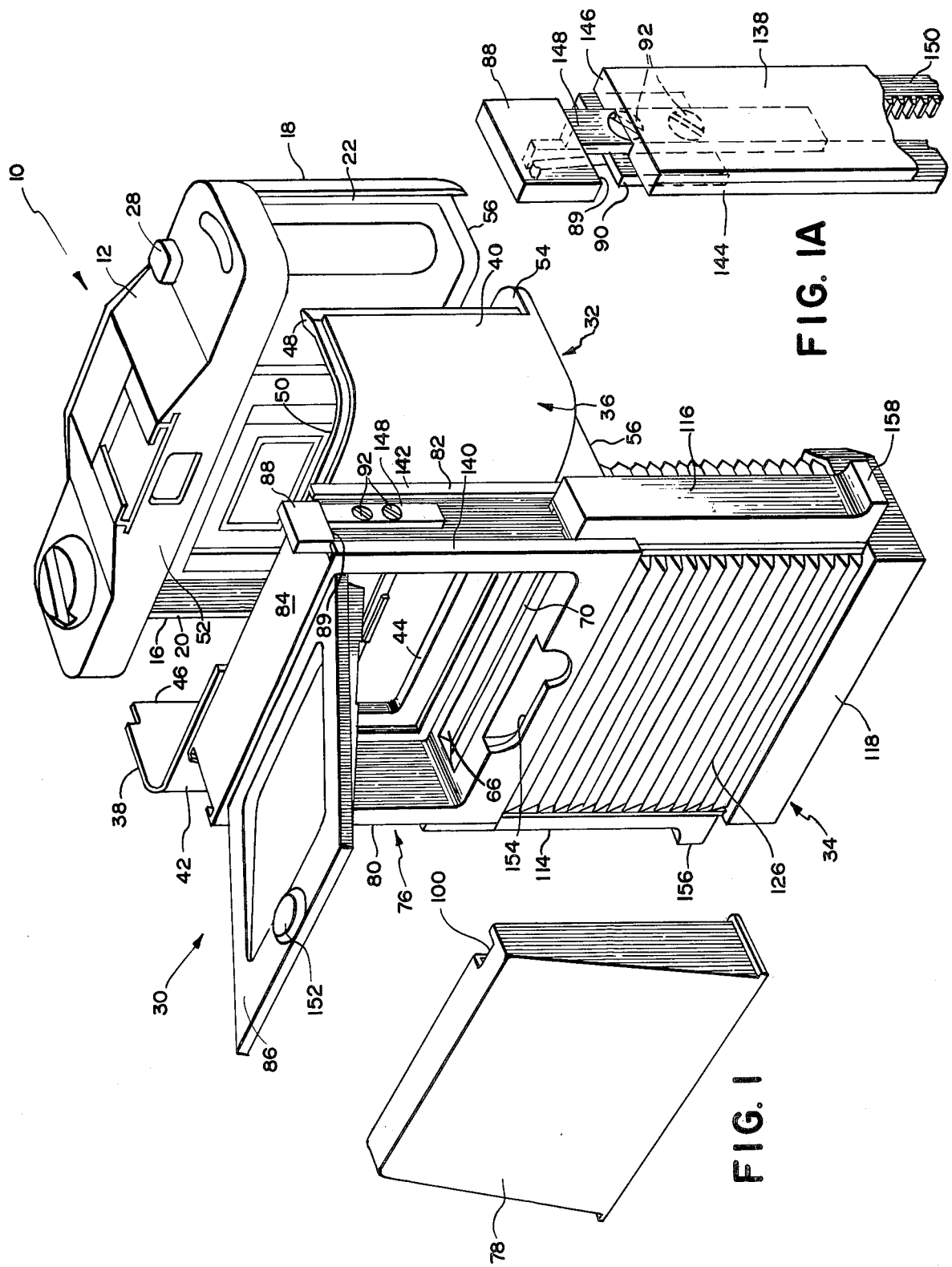
FIG. 1 is an exploded perspective view of the camera back of the instant invention shown in relation to the main body of a conventional camera.

Reference is now made to FIG. 1 wherein is shown a camera 10 of the conventional or non-instant type. As stated above the camera 10 is preferably a Minox 35 EL and includes a main housing 12 having a front wall 14 whose laterally opposite ends terminate in rearwardly extending flanges 16 and 18 each of which includes a recess 20 and 22. The front wall 14 includes a recess (not shown) for receiving a lens and shutter assembly 24. The assembly 24 is moved out of the recess and into its operative position by pivoting a lens and shutter assembly cover 26 counterclockwise into the position shown in FIG. 2. A shutter release button 28 is mounted on the top wall of the main housing 12.

The camera back 30 of the instant invention is specifically constructed to replace the back of the camera 10. The camera back 30 is comprised of first and second housings 32 and 34, respectively, which are slidably connected to each other. The first housing 32 includes a generally U-shaped section 36 the legs 38 and 40 of which are interconnected by a wall 42 having an exposure opening 44 therein. The free ends of the legs 38 and 40 are provided with forwardly extending ribs 46 and 48 which are adapted to be slidably received by the recesses 20 and 22 for connecting the camer back 30 to the main camera housing 12. The top edges of the legs 38 and 40 and the wall 42 are provided with a rib 50 which is adapted to be received by a groove (not shown) in the top wall 52 of the main camera housing 12. The lighttight connection between the housing 12 and the camera back 30 is completed by a lower wall 54 which is adapted to be located in engagement with a lower wall 56 of the housing 12.

The lower wall 54 includes a chamber 56 for slidably receiving a spread roller assembly. The assembly includes a U-shaped bracket comprising a pair of parallel legs 58 (only one of which is shown) interconnected by a transversely extending bight portion 60. Each of the legs 58 is provided with an elongate slot 62 for receiving one of the journals 64 of a spread roller 66 and a hole 68 having a bearing surface for rotatably supporting one of the journals of another roller 70. A spring and bearing block assembly 72 is mounted within each slot 62 for resiliently urging the journals 64 of the roller 66 into engagement with the right hand end of the slot 62 so as to provide a predetermined minimum spacing between the rollers 66 and 70 to facilitate the introduction of the leading edge of a film unit therebetween. A gear 74 is fixedly attached to opposite ends of the roller 70. A portion of each gear 74 extends beyond the outside surface of each of the legs 58 so as to enable their enmeshment with a pair of gear racks to be described later.

Extending rearwardly of the wall 42 is a chamber 76 for receiving a film cassette 78. The chamber 76 is defined in part by a pair of channeled side walls 80 and 82 and an intermediate wall 84. Access to the chamber 76 is via a film loading door 86 which is suitable hinged to the wall 84 for movement into the position shown in FIG. 1 wherein the film cassette 78 may be loaded into the chamber 76.

Figure 4:
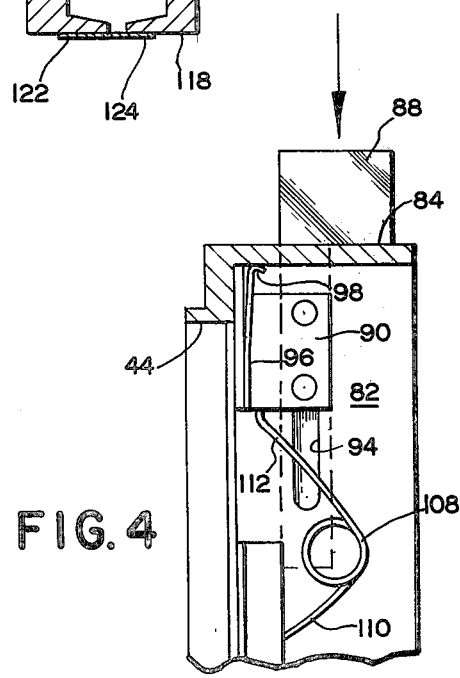
FIG. 4 is an enlarged side elevational view of the film advancing apparatus of the camera back.

As shown in FIG. 1, the channeled side wall 82 provides a means for mounting a manually actuatable film advancing apparatus. This apparatus includes a plate 88 which is secured to an L-shaped carrier 90 by a pair of screws 92 which extend through an elongate slot 94 (see FIG. 4) in the side wall 82. Note, in FIG. 1A, the side wall 82 has been omitted for reasons of clarity. A strap 96 of resilient material having a cantilevered end 98 is suitably secured to the carrier 90 for movement into an ingress opening 100 in the film cassette 78 prior to engaging a film unit 102 by its trailing edge 104 and moving it out of the cassette 78 via an egress opening 106. The carrier 90 is resiliently biased in a direction away from the trailing edge 104 of the film unit 102 by a spring 108 having one end 110 secured to the side wall 82 and its other end 112 in engagement with the carrier 90.

The second housing 34 of the camera back 30 is coupled to the first housing 32 for reciprocating movement. The second housing 34 includes a U-shaped section defined by a pair of parallel legs 114 and 116 interconnected by a bight portion 118 having an opening 120 therein through which an exposed film unit 102 is adapted to protrude into the ambient light. The opening 120 is made lighttight by securing one end 122 of an opaque resilient material 124 to the bight portion 118 such that the unattached portion extends across the opening 120. An expansible bellows 126 formed from an opaque material has one of its open ends secured to the bight portion 118 in surrounding relationship to the slot 120 and its opposite end secured to the lower wall 128 of the first housing is surrounding relationship to an exit slot 130 in the lower wall 128. The bellows 126 defines a dark chamber 132 into which an exposed film unit 102 is adapted to be advanced prior to moving it into the ambient light. A film unit retainer 134 having an opening 136 therein in fixedly mounted within the chamber 132 with the opening 136 in alignment with the exit slot 130.

An elongate plate 138 (see FIG. 1A) is secured to the inwardly facing surfaces of the legs 114 and 116. Each plate 138 has a width substantially equal to the width of the channeled side walls 80 and 82 such that its lateral edges lie below the flanges 140 and 142 of the side walls. Mounted to the inwardly facing surfaces of the plates 138 are a pair of members 144 and 146, which members are spaced apart from each other by a distance just greater than the width of the vertical portion 148 of the plate 88. Each of the members 146 is provided with gear teeth 150 which are adapted to mesh with the gears 74 on the opposite ends of the roller 70. The gear teeth 150 terminate short of the upper end of the member 146 so as not to interfere with the passage of the vertical portion 148 of the plate 88 between the members 144 and 146.

OPERATION

Figure 2:
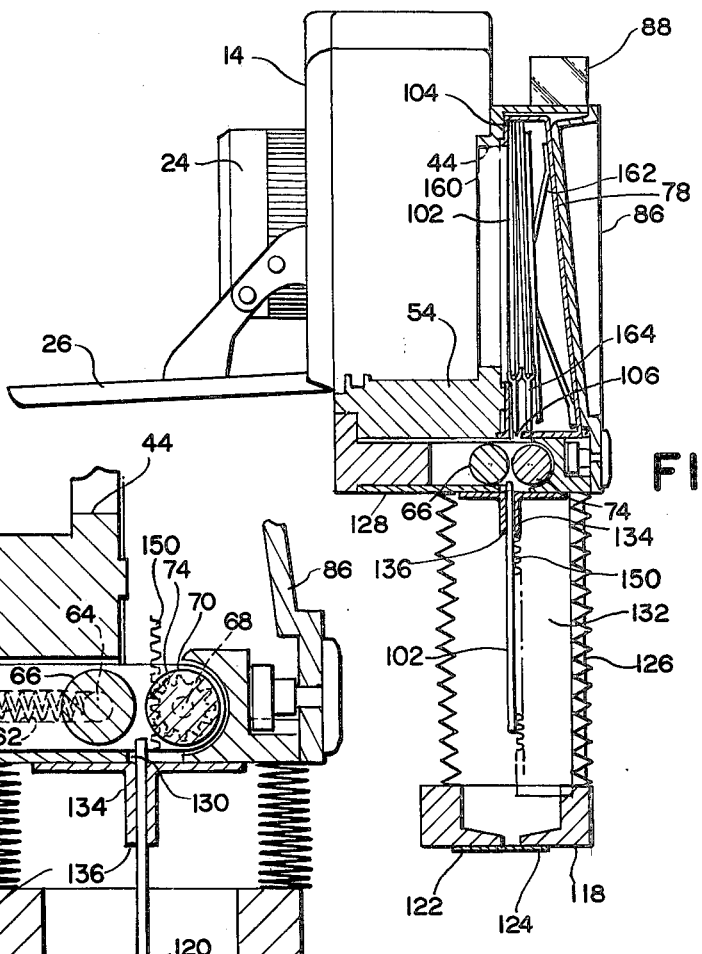
FIG. 2 is a side elevational view, partly in section, of the instant invention.
Figure 3:
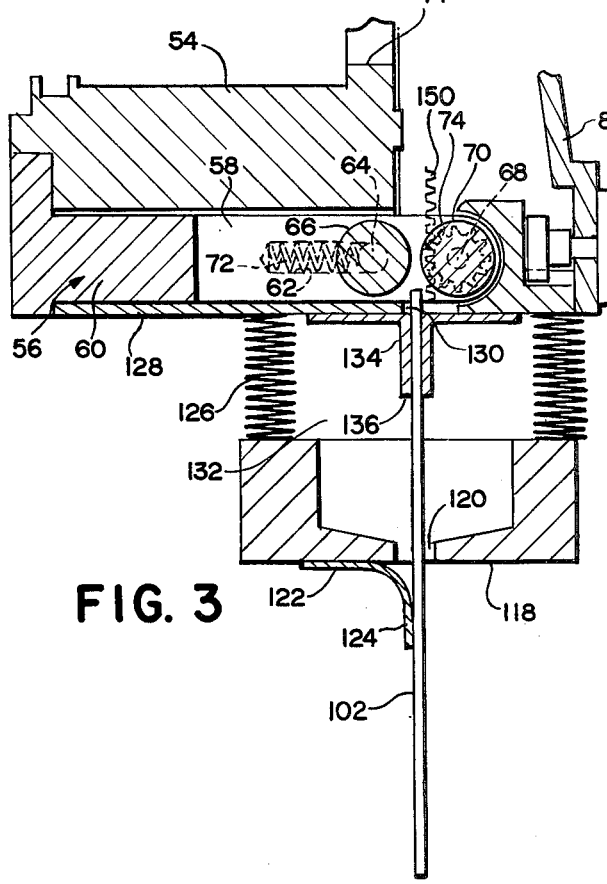
FIG. 3 is an enlarged side elevational view of a portion of FIG. 2 with the camera back's dark chamber shown in a collapsed or retracted position.

When it is desired to use film units of the self-developing type rather than conventional film, the back of the camera 10 is removed and the camera back of the instant invention substituted therefore. At this time, the second housing 34 is in its retracted position, as shown in FIG. 3. The loading door 86 is then pivoted into the position shown in FIG. 1 and a film cassette 78 of the type described is inserted into the film chamber 76 and then the loading door 86 is pivoted into its closed position and secured therein by any suitable means such as a latch 152 whose opposite end is adapted to be slidably received within a slot 154. The operator of the camera then depresses the manually actuatable plate 88 thereby moving the cantilevered end portion 98 of the strap 86 into the ingress opening 100 in the film cassette 78 so as to engage the trailing edge of a dark slide and move it out of the cassette via the exit slot 106 and into engagement with the spread rollers 66 and 70. As the plate 88 approaches the end of its downward stroke, a shoulder 89 on the plate 88 engages the top surfaces of the elongate plate 138 and the members 144 and 146 and moves them downwardly a distance which drives the roller 70 sufficiently to enable it to pull the leading edge of the opaque film cover, i.e., the dark slide fully into the bite between the rollers 66 and 70. Alternatively, the leading edge of the film unit may be maintained in engagement with the rollers by keeping downward pressure on the plate 88. The outwardly extending ends 156 and 158 of the legs 114 and 116 respectively are then grasped by the forefinger and the thumb and moved in a direction away from the first housing 36 so as to incrementally extend the bellows 126. During this extension, the teeth 150 on the members 146 drive the roller 70 via the gears 74 so as to continue the advancement of the dark slide through the rollers and into the dark chamber 132 wherein its leading edge is maintained in alignment with the opening 120 by the film unit retainer 134. At this time, the bellows is fully extended as shown in FIG. 2. The second housing 34 is then moved back into its original position, as shown in FIG. 3. During this retraction, the opening 120 gradually approaches the leading edge of the dark slide until eventually it, the leading edge, protrudes through the opening 120 and deflects the light shield 124 as it emerges from the dark chamber 132. This protruding action, while repeatable in the instant invention as a normal step during the sequential exposure of the film units in the cassette, is somewhat similar to that action described in the folding of the camera described in the copending application of Thomas Svatek et al entitled "Expandable Self-Developing Camera" Ser. No. 784,247, filed Apr. 4, 1977. The camera is now ready for exposure of one of the film units 102, which film unit is urged into alignment with an exposure aperture 160 in the forward wall of the film cassette 78 by a spring 162. After exposure of the forwardmost film unit 102 in the film cassette, 78, the plate 88 is again depressed thereby advancing the leading edge of the exposed film unit into engagement with the rollers 66 and 70. The legs 114 and 116 are again grasped by the outwardly extending members 156 and 158 and moved so as to fully extend the bellows 126. During this extension, the gear teeth 150 drive the roller 70 so as to draw the film unit between the rollers 66 and 70. As the film unit is advanced by the rollers, the latter rupture a container 164 of processing liquid and spread the contents thereof between elements of the film unit so as to initiate the formation of a visible image within the film unit. Simultaneously therewith, the rollers 66 and 70 advance the film unit through the openings 130 and 136 into the continually expanding dark chamber 132. If the film unit 102 is of the type which no longer needs to be protected from the ambient light, the second housing may then be moved back to its original grasped position so as to enable the leading end of the exposed film unit to protrude to the outside of the chamber 132 via the opening 120. On the other hand, if the film unit is of the type which must be maintained within a dark environment for a time sufficient to enable the processing liquid to imbibe the film unit sufficiently to prevent any adverse fogging of the film unit when exposed to the ambient light, then the dark chamber 132 is maintained in its extended position for a predetermined period of time. As described hereinabove, this predetermined period of time is that time necessary for the processing fluid to imbibe the film unit sufficiently such that it may be advanced into the ambient light via the opening 120 without any adverse fogging of the film unit. At the end of this predetermined period of time, the second housing 34 is returned to its original retracted position. During this retraction, the leading end of the film unit eventually protrudes through the opening 120 to the exterior of the dark chamber 132 wherein it may be grasped by the user and removed from the film unit retainer 134. If the film unit is of the type described in the aforementioned U.S. Pat. No. 3,647,437, it may have a strippable opaque back which may be readily removed from the film unit prior to placing it in a slide projector.

From the foregoing, it can be seen that there has been disclosed a compact, readily attachable camera back for converting a camera of the conventional type for use with self-developing type film units. Once the conversion has been made, the user need only add a lens which will increase the focal length of the existing lens to the plane in which the self-developing type film unit is supported.

Since certain changes may be made in the above camera back without departing from the scope of the invention herein involved, it is intended that all matter contained in the above description or shown in the accompanying drawings shall be interpreted as illustrative and not in a limiting sense.

What is claimed is:

1. A compact camera back for attachment to a front camera body having an optical exposure system, said camera back comprising:

a first housing including means for locating a film cassette containing a plurality of film units in position for exposure of one of the film units;

means for rapidly attaching said first housing to the front camera body in a lighttight manner such that said locating means is positioned to support the film cassette with one of the film units located in alignment with the optical exposure system;

film advancing means mounted adjacaent said locating means for movement into engagement with the film unit located in said exposure position so as to move the film unit, subsequent to exposure, through an exit slot in the film cassette;

a pair of juxtaposed rollers mounted adjacent said locating means in position to receive the exposed film unit therebetween as it exits from the film cassette;

a second housing including means for defining an expansible chamber, formed from an opaque material, said chamber having an open end fixedly secured to said first housing at a location adjacent said rollers and its opposite open end secured to an end wall of said second housing, said end wall having a light sealed slot therein through which the exposed film unit is adapted to be advanced into the ambient light;

means for releasably retaining the exposed film unit after it has moved out of engagement with said rollers such that an end of the exposed film unit is positioned for subsequent passage through said light sealed slot;

manually actuatable means for moving said film advancing means into engagement with the exposed film unit so as to advance it through the exit slot in the film cassette and into engagement with said rollers;

means coupled to said second housing and to at least one of said rollers for driving said one roller in response to the movement of said second housing relative to said first housing; and means for manually reciprocating said second housing from a first position wherein said expansible chamber is in a collapsed position to a second position wherein said expansible chamber is in an extended position and, after a predetermined period of time, back to said first position, said movement from said first position to said second position being transmitted through said driving means to said one roller to continue the advancement of the exposed film unit away from the film cassette and into engagement with said retaining means while simultaneously spreading a liquid processing composition associated with the exposed film unit across a layer thereof to initiate the formation of a visible image therein, and said movement of said second housing back to said first position being effective to move an end of the exposed film unit through said light sealed slot in said end wall of said second housing.

2. A camera back as defined in claim 1 wherein said manually actuatable means includes means movable into engagement with said driving means for moving the latter so as to rotate said one roller sufficiently to move an end of the exposed film unit into the bite of said rollers.

* * * * *